May 5, 1925. 1,536,794
G. INNES
GRAIN SHOCKER
Filed Nov. 17, 1922 5 Sheets-Sheet 1

Inventor.—
George Innes.
by his Attorneys.—

May 5, 1925.

G. INNES

GRAIN SHOCKER

Filed Nov. 17, 1922  5 Sheets-Sheet 4

1,536,794

Inventor.
George Innes.
by his Attorneys.
Howson & Howson

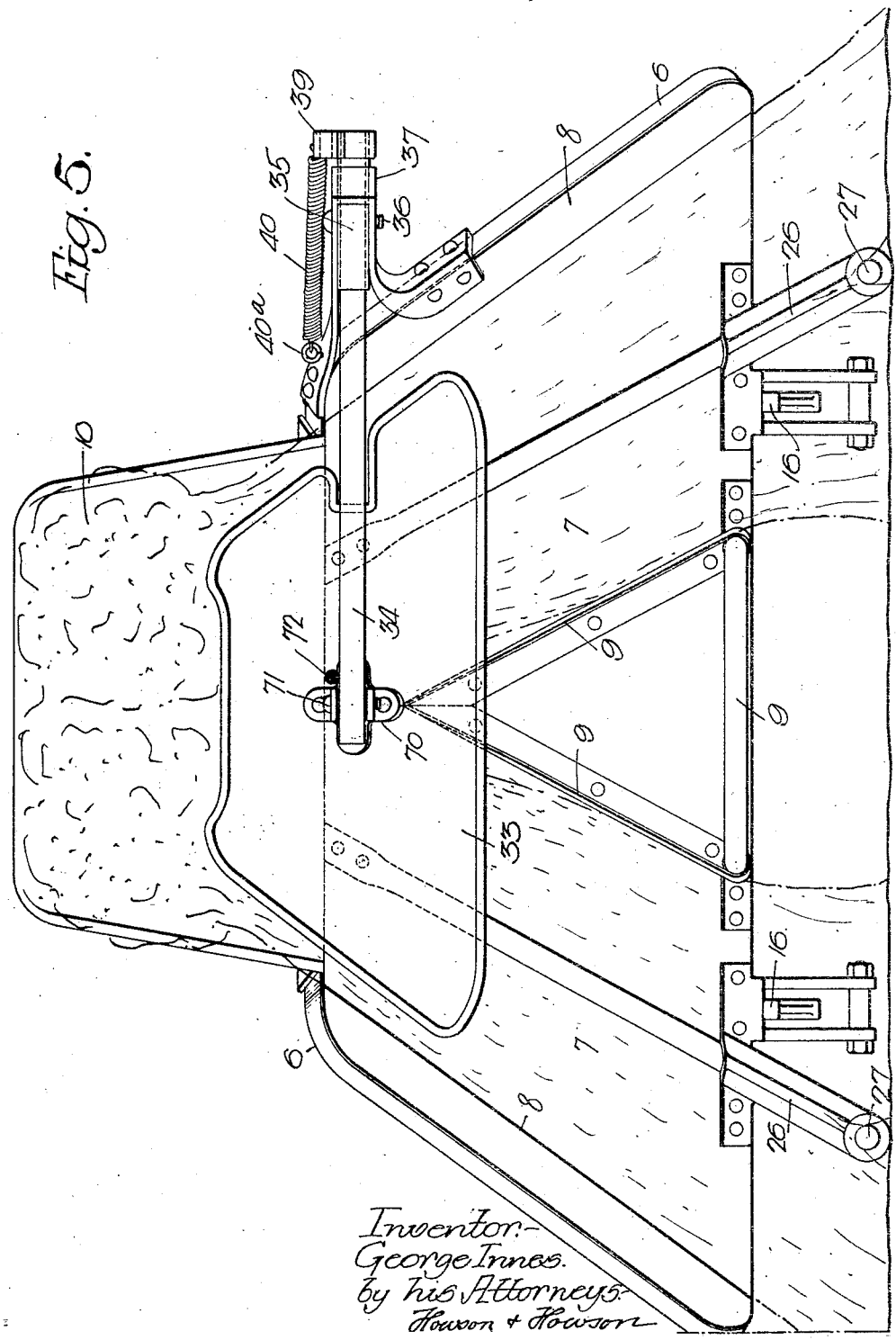

Patented May 5, 1925.

1,536,794

UNITED STATES PATENT OFFICE.

GEORGE INNES, OF DAVENPORT, IOWA.

GRAIN SHOCKER.

Application filed November 17, 1922. Serial No. 601,550.

*To all whom it may concern:*

Be it known that I, GEORGE INNES, a citizen of the United States, residing in Davenport, Scott County, Iowa, have invented certain Improvements in Grain Shockers, of which the following is a specification.

My invention relates to certain improvements in machines for assembling grain of the type having a basket, in which the bundles of grain are assembled to form a shock, the basket being turned to discharge the shock onto the ground. In this type of machine, the basket is open at the top to receive the bundles of grain.

One object of my invention is to provide means, such as a gate, to close the open end of the basket after the bundles have been placed in position so that, when the basket is turned, the gate will prevent the displacement of the bundles while the basket is moving from the receiving to the discharging position.

A further object of the invention is to provide means for moving the gate clear of the standing shock after it has been opened by the movement of the basket from the shock.

Figure 1:
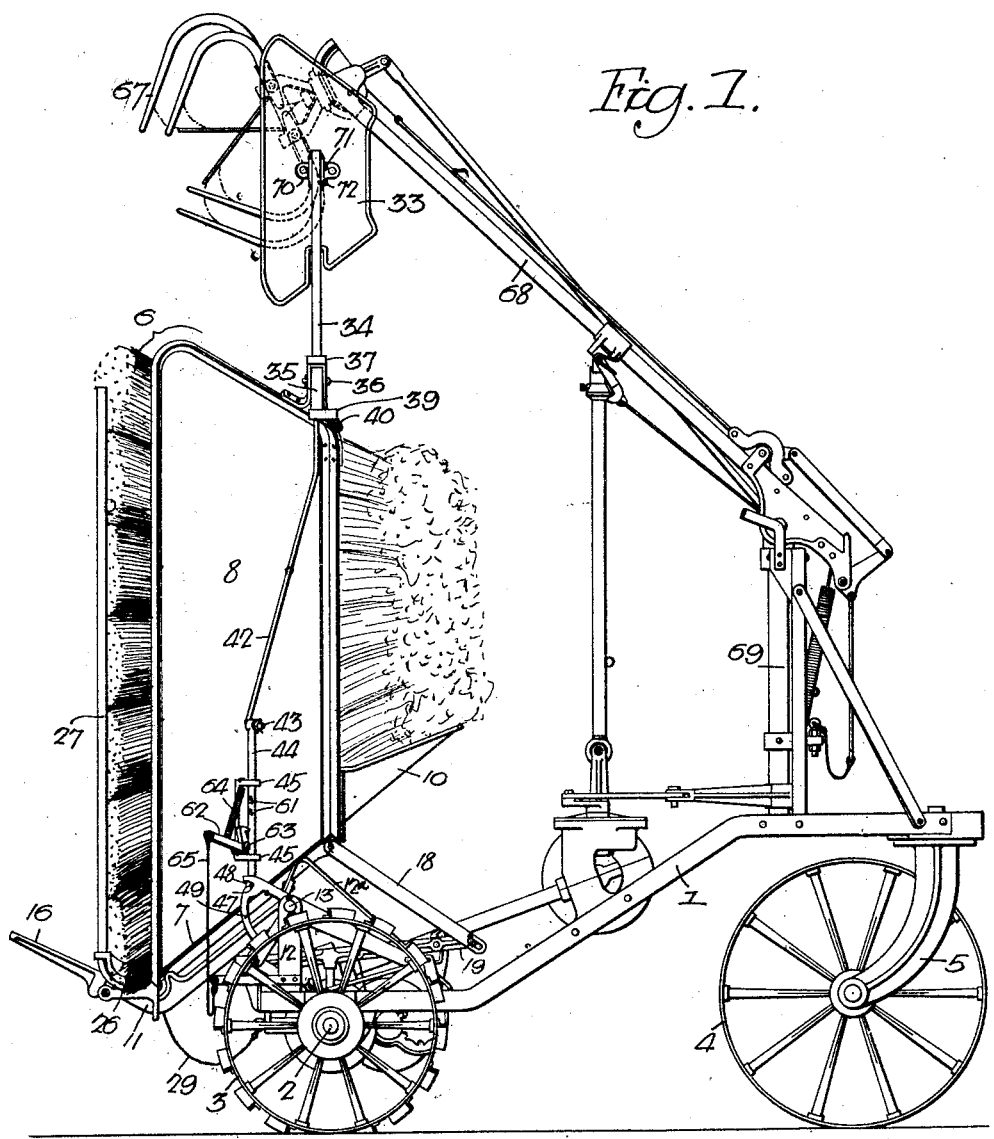
Fig. 1 is a side view of a grain shocker illustrating my invention, the gate being in the raised position to allow the grapple to place the bundles in the basket.
Figure 2:
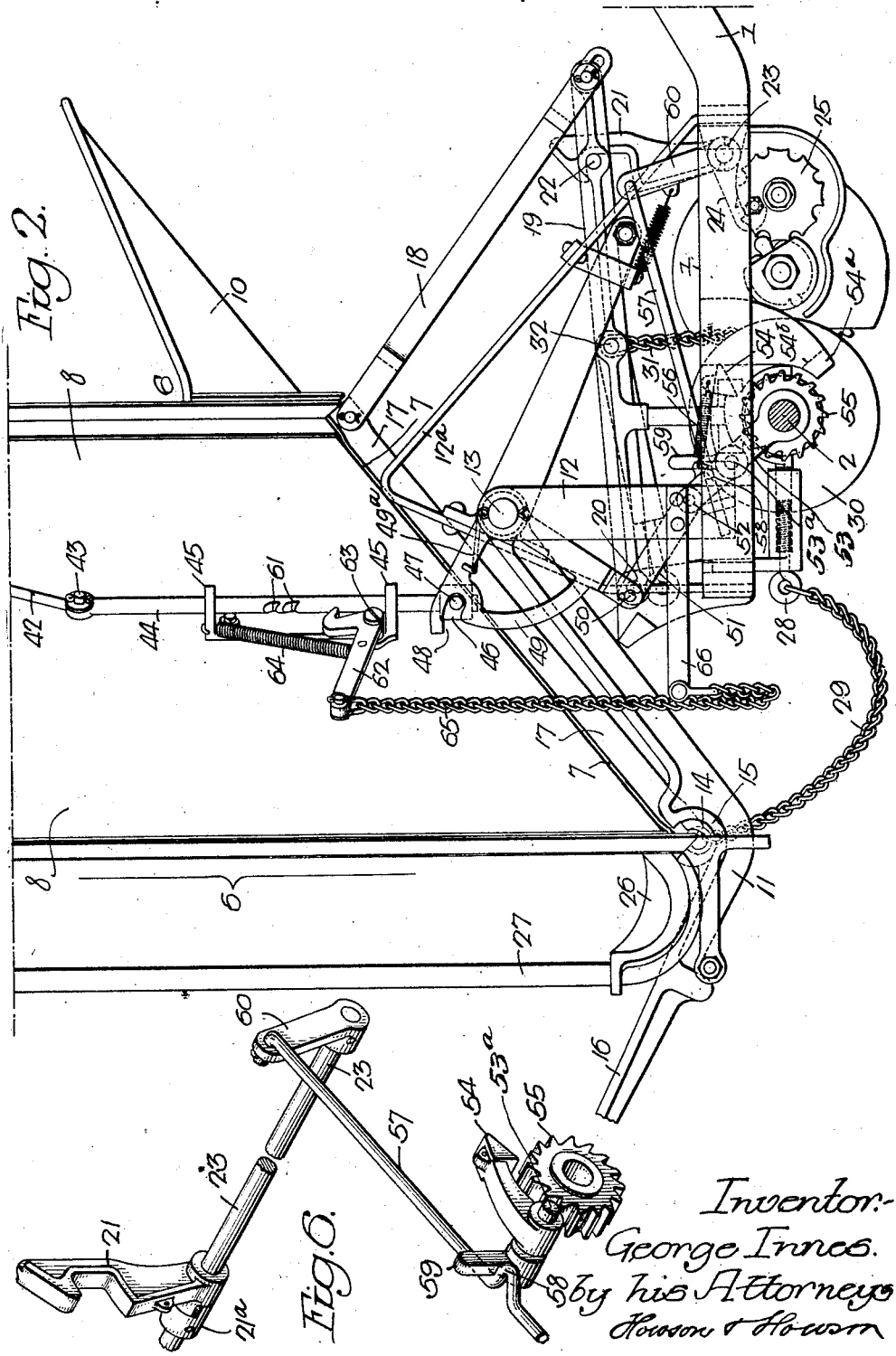
Fig. 2 is an enlarged side view of the lower portion of the mechanism shown in Fig. 1.
Figure 3:
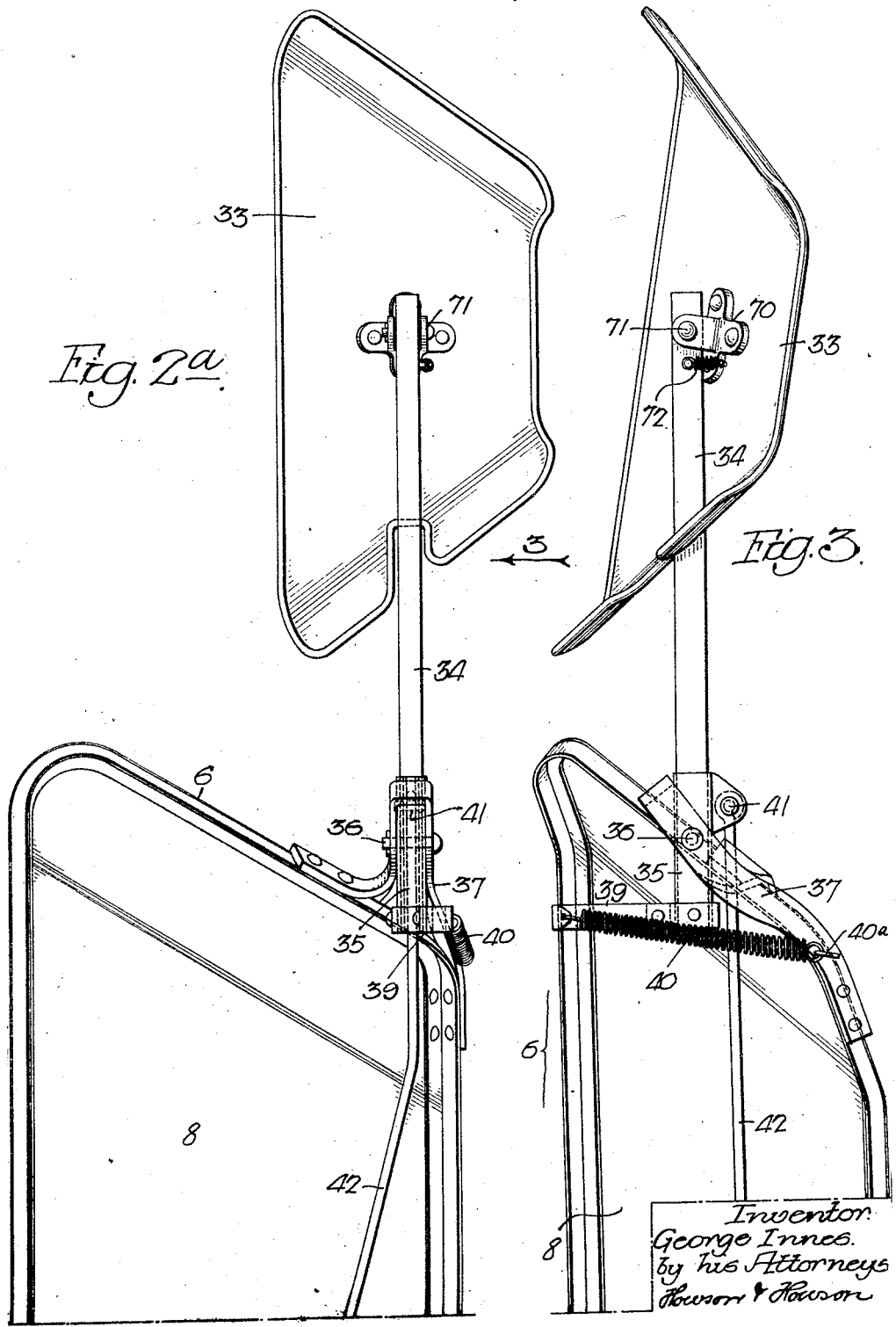
Figure 4:
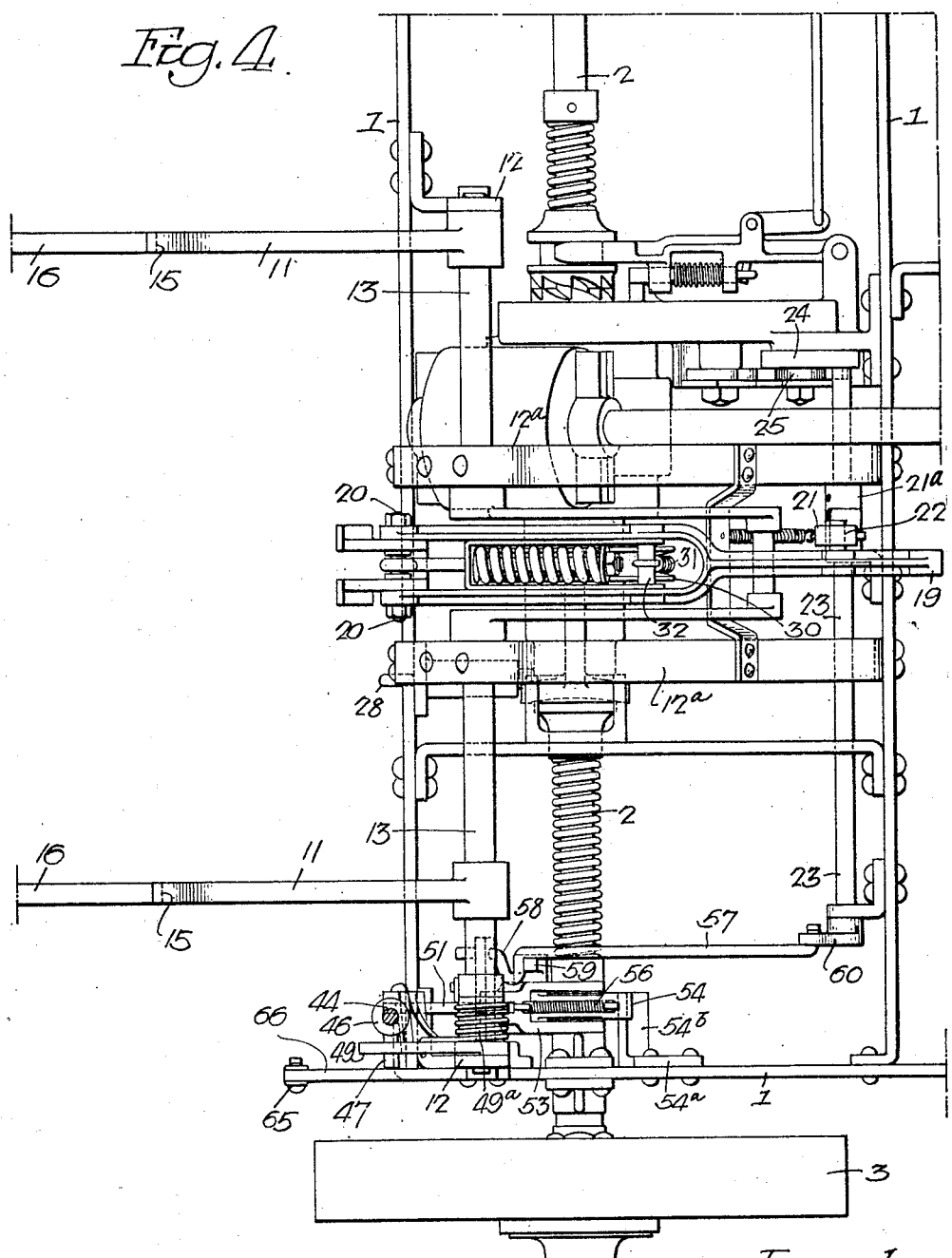

Fig. 2ª is an enlarged view of the upper portion of the mechanism shown in Fig. 1;

Fig. 3 is a view looking in the direction of the arrow 3, Fig. 2;

Fig. 4 is a plan view of the lower portion of the grain shocker illustrating the operating mechanism connected to my improved gate;

Fig. 5 is a rear view showing the basket in the discharging position and the gate closing the rear end of the basket; and Fig. 6 is a perspective view of the gate latch operating mechanism.

My improved gate mechanism is shown in connection with the grain shocker illustrated in the application for patent filed by me on the sixth day of January, 1920, Ser. No. 349,706, although it will be understood that the invention can be applied to other types of grain shockers, in which a basket is used to receive the bundles of grain, the basket being turned to discharge the formed shock onto the ground.

Referring to the drawings, 1 is the frame of the machine. 2 is an axle, on which are the traction wheels 3. The forward end of the frame 1 is supported by a wheel 4, carried by a swiveled arm 5, pivoted to the frame 1. This frame is connected to the binder in any suitable manner. The mechanism of the binder is used to impart motion to release the mechanism on the frame, which releases the basket and allows it to fall onto the ground.

6 designates the basket, which has a closed base 7 and flaring side member 8. At the center of the basket is a vertical V-shaped partition 9, and at the front of the basket is an extension 10 of the base. This extension supports the heads of the bundles of grain, as shown in Fig. 1. The basket is pivotally mounted on rearwardly extending arms 11. These arms are pivoted at 13 to standards 12, 12 and 12ª, 12ª on the frame. The pivots 14 of the basket normally rest in socket 15 in the arms 11, and, when the basket is turned to discharge its load, the portions 16, as they are moved forward, pass under the pivots. The pivots 14 are integral parts of the brackets 26 attached to the base of the basket. A frame 17 is secured to the base of the basket and connected to the upper end of this frame is a link 18, which, in turn, is connected to an arm 19 pivoted at 20 to the frame of the machine. The arm is held in the position shown in Fig. 2 by a retaining latch 21 engaging a pin 22. This latch is pivoted on a shaft 23 mounted in bearings on the frame 1. The shaft 23 has an arm 24 actuated by a "Geneva" gear 25 in substantially the same manner as described in the application hereinbefore referred to.

The brackets 26 project from the lower rear end of the basket. On the brackets are rods 27. These rods are located some distance from each side of the center of the basket and act to hold the butt ends of the bundles in place. When the basket is turned onto the ground, the rods are close to the ground and are drawn through the lower end of the shock as the basket moves away from the shock. The lower portion of the basket is connected to a spring-pressed locking bolt 28 by a chain 29. The retraction of the bolt releases the clutch mechanism that controls the wheel 30 on which the chain 31 is wound. The chain 31 is connected at 32 to the arm 19 and turns the basket on its pivots to the vertical position, as shown in Fig. 1. after it has discharged its load.

In order to close the open end of the basket, a gate 33 is provided, preferably shaped as shown in Figs. 2ª and 3, so as to fit the flared end of the basket, as illustrated in Fig. 5. This gate is mounted on a rod 34, which is secured to a lever 35 pivoted at 36 to a bracket 37 on the upper end of one side 8 of the basket. Attached to an arm 39 on the lever 35 is a spring 40, which is also attached to an eye 40ª on the bracket 37. The arm is so designed that, when the gate is turned to close the basket, the spring passes the pivot 36 and acts to retain the gate in its closed position. When the gate is moved, by coming in contact with the shock as the basket is moved forward after the grain has been discharged onto the ground, the spring is moved past the pivot in the opposite direction, and swings the gate to its full open position, illustrated in Figs. 2ª and 3.

An operating rod 42 is connected to the lever 35 at 41 and to a bolt 44 mounted in bearings 45 on one of the sides 8 of the basket. This bolt has a head 46 at its lower end. A pin 47, on the head, rests in a slot 48 in a segment 49 mounted on the pivot 13. Pivoted to the segment at 50 is a link 51, which is, in turn, pivoted at 52 to an arm 53 loosely mounted on the axle 2. Pivotally mounted on a stud 53ª projecting from the arm 53 is a latch 54, which is raised clear of a ratchet wheel 55 by a spring 56 and is moved into engagement with the wheel by a projection 58 on a rod 57, which strikes an arm 59 on the latch. The rod is connected to a lever 60 secured to the pivot shaft 23, on which the latch 21 is loosely mounted. On this shaft is a collar 21ª having a projection adapted to engage a projection on the latch after the pivot shaft has moved a certain distance. By this construction, the lever 60 is operated prior to the movement of the latch 21. The movement of the lever 60 causes the segment 49 to be turned and the gate 33 to be closed through the movement of the arm 53, which is effected by the latch 54 coming in contact with the teeth of the ratchet wheel 55 fixed on the rotating axle 2.

The releasing of the latch 54 from the wheel 55 is effected by a bracket 54ª attached to the frame 1 having a lug 54ᵇ located within the path of the latch 54. This lug releases the latch from the teeth of the ratchet wheel 55. A spring 49ª returns the segment, and its associated elements, to their normal positions.

After the last pair of bundles of grain has been placed in the basket, the arm 60 is moved by the Geneva gear and there is a certain amount of lost motion between the arm 60 and the latch 21. The latch 54 is moved into engagement with the ratchet wheel 55 prior to the release of the basket, causing the mechanism to close the gate, which is locked by a catch 62, so that, when the basket turns on its pivot to discharge the bundles of grain onto the ground to form a shock, the bundles are held positively in the position in which they have been placed in the basket, due to the locked gate closing the end of the basket. As the sides of the basket are rigid, the bundles cannot be displaced. The basket remains on the ground while the shock is assuming its position of rest on the ground.

Just prior to the forward movement of the basket after the slack of the chain 29 is taken up, the gate is released from the control of the catch 62. When the basket moves forward, the initial opening movement of the gate is caused by its contact with the end of the shock. When the spring 40 passes the pivot 36 of the gate, it moves the gate positively to its full open position. The rod 44 has notches 61 arranged to be engaged by the catch 62, which is pivoted at 63 to the bearing 45. A spring 64 tends to move the catch in engagement with the rod 44, as shown in Fig. 2. The catch is connected by a chain 65 to a portion 66 of the frame. The chain 65 is so proportioned to the chain 29 that it withdraws the catch 62, releasing the gate prior to the forward movement of the basket.

One form of grapple that can be used in connection with my invention is illustrated in Fig. 1. The grapple 67 is mounted on a boom 68 pivotally mounted on a mast 69 and controlled by mechanism such as described in the application hereinbefore alluded to. As this boom construction forms no part of the present invention, it is not described in detail.

The gate 33 is preferably mounted on the end of the rod 34 in such a manner that the gate will accommodate itself to any slight unevenness in the arrangement of the last bundles which form the shock.

70 designates a plate secured to the gate and having lugs for the pivot pin 71. A spring 72, attached to the rod and to the plate, tends to hold the gate yieldingly in position against the rod, but allows the gate to accommodate itself to the bundles.

The operation is as follows: The grain is received by the shock-forming machine from the binder—one bundle at a time. The bundles are first assembled in pairs. Each bundle is preferably arranged at an angle in which it will repose in the shock. The grapple engages two bundles and transfers them to the basket, one bundle being located on one side of the central partition of the basket and the other bundle being located on the opposite side of the central partition. This operation is repeated until a predetermined number of bundles has been located in the basket. The gate 33 is then moved to its closed position at the end of the basket to retain the bundles of grain in their proper position within the basket so that, during the rapid movement of the basket from its vertical to its horizontal position, the bundles will not become loosened from each other, having previously been packed within the basket by the lash of the boom and grapple. The basket-retaining latch is then moved to release the basket so that it will turn on its pivots to the shock-discharging position on the ground. When the assembled bundles, forming the shock, are deposited on the ground with the basket, the rear end bundles are retained in their proper position with respect to the shock and the basket remains momentarily with the shock while the machine is moving forward. Continued movement of the machine away from the basket causes the slack to be taken up, first in the gate catch chain, thereby unlocking the gate, and then in the chain that controls the operating clutch of the basket-retrieving mechanism, which mechanism is thereby set in motion. Tightening of the latter chain gives the basket a sudden jerk to draw it from around the standing, inert shock.

I claim:

1. The combination in a machine for shocking grain of a basket, having a rectangular frusto-pyramidal form and including a core of a substantially triangular pyramidal form, whose base lies in a plane coincident with that of the base of the basket frustrum, said basket being mounted in such manner on the frame of the machine that its base extends in a vertical plane therefrom; means for placing individual pairs of bundles in the basket, one bundle of each pair at each side of the core simultaneously; a gate mounted at the uppermost end of the basket designed to close, at an angle coincident therewith, the normally open end of said basket; means for closing the gate after a predetermined number of bundles have been placed within the basket; and means for positively locking the gate against displacement prior to the movement of the basket to discharge its load.

2. The combination in a machine for shocking grain of a basket having the form of a rectangular pyramidal frustrum, mounted on the frame of the machine with one of its narrow ends in pivotal contact therewith, its opposite end being open for the purpose of loading; a grapple for placing individual pairs of bundles in the basket successively; a gate designed to close said open end after a predetermined number of bundles have been placed therein; means for locking the gate in its closed position; means for tilting the basket to effect the discharge of its load onto the ground; means for unlocking the gate immediately prior to the withdrawal of the basket from the standing shock; means for withdrawing the basket from the shock and causing the gate to open by contact therewith on the initial movement of the basket with respect to the inert shock; and skids spaced apart from and parallel with the base of the basket to permit free movement of the basket over the surface of the ground while the basket is being moved clear of the shock.

3. The combination in a shock-forming machine, of a basket; means for tilting the basket to allow the assembled bundles of grain to be discharged onto the ground in the form of a shock; a gate pivotally mounted on the upper end of the basket and arranged to hold the upper end bundles in position; a segment connected to the gate; means for actuating the segment to close the gate; means for releasing the basket connected to the means for closing the gate; and means for holding the gate in its closed position, said means being arranged to release the gate after the shock has assumed a fixed position on the ground and before the basket is withdrawn from the shock.

4. The combination in a shock-forming machine, of a basket; means for tilting the basket to effect the discharge of the assembled bundles contained within the basket; a bracket mounted at the upper end of one of the sides of the basket; a lever, having a short and a long arm, pivoted to said bracket and being capable of a swinging movement in a plane parallel to that of the base of the basket, said bracket acting to limit the movement of the lever in one direction; a spring having one of its ends attached to the short arm of the lever and its opposite end attached to the bracket for maintaining the lever in contact with the bracket limit stop, and holding the long arm of the lever in a vertical position; a gate pivoted to the upper end of the long arm of the lever designed to close the normally open end of the basket; and means for closing the gate after the last pair of bundles have been placed in the basket and prior to the movement of the basket to discharge its load.

5. The combination in a shock-forming machine of a basket, means for tilting the basket to discharge its load; a gate lever pivoted at the upper end of the basket; a gate pivoted to said lever; a spring attached to said lever for maintaining the gate in a normally open position; a bracket mounted on one side of the basket adjacent the lower end thereof; a locking bolt slidably mounted in said bracket; a rod connecting said locking bolt with the gate lever; a locking latch pivoted to the bracket; notches in the locking bolt for engagement with the locking latch; a segment pivoted to the frame of the machine and having a recess in the outer edge thereof; a collar on the locking bolt having a protruding pin for engagement with the recess of the segment and means for actuating the segment to close the gate after the last pair of bundles have been placed in the basket prior to the movement of the basket to discharge its load.

6. The combination in a shock-forming machine, of a frame; an axle mounted in bearings on the frame; traction wheels independently connected to the axle for causing rotation of the same; a basket mounted on said frame; a gate for closing the normally open end of said basket; a locking bolt connected to said gate; a segment pivoted to the frame and having its outer edge operatively connected to the locking bolt; a ratchet wheel fixed to the axle; a forked lever loosely mounted on the axle; a link connecting the forked lever with the segment; a pawl pivoted to the forked lever for engagement with the ratchet wheel; an arm secured to the pawl; a rock-shaft mounted in bearings on the frame; a lever secured on said shaft; a rod having one end attached to said lever, its opposite end being operatively connected to the said pawl arm; means for causing the shaft to rock when a predetermined number of bundles has been placed in the basket, causing the closing and locking of the gate prior to the tilting of the basket for depositing its load on the ground in the form of a shock.

7. The combination in a shock-forming machine, of a frame; an axle rotatably mounted thereon; traction wheels on said axle; a tilting shaft mounted in bearings on the frame; arms on the tilting shaft; a basket pivotally mounted at its lower edge in the bend of said arms; basket retrieving means associated with said tilting arms; a gate on the basket; means for closing the gate; means for locking the gate in its closed position; a rock shaft; a lever on the rock shaft for controlling the operation of said gate closing means; a retaining latch on said rock shaft for holding the basket in its loading position; a segmental projection on said latch; a collar secured to said rock shaft adjacent the latch; a segmental projection on said collar overlying the said segmental projection on the latch, for permitting lost motion in the movement of the latch and the rock shaft; and means for operating the rock shaft for successively closing the gate and releasing the basket to discharge its load after a predetermined number of bundles have been placed in the basket.

8. The combination in a shock-forming machine, of a frame, a basket on the frame; means for loading the basket with bundles of grain; a gate for closing the open end of the basket; a gate latch for retaining the gate in its closed position; means for depositing the basket, with its contained load on the ground; flexible connecting means between the basket and the frame of the machine for permitting the basket with its contained load to remain quiescent on the ground for a period of time as the shocking machine advances; a shortened flexible connector between the gate latch and the frame of the machine for releasing the gate latch prior to the tightening of the flexible connectors between the basket and the frame of the machine; and means for returning the basket to its loading position after it has been withdrawn from and clear of the shock.

GEORGE INNES.